United States Patent [19]
Kohno et al.

[11] Patent Number: 6,118,592
[45] Date of Patent: Sep. 12, 2000

[54] ZOOM LENS SYSTEM

[75] Inventors: Tetsuo Kohno, Toyonaka; Kenji Konno, Sakai; Mamoru Terada, Sakai; Tetsuya Arimoto, Sakai; Takashi Okada, Nishinomiya; Kazuhiko Ishimaru, Kishiwada, all of Japan

[73] Assignee: Minolta Co., Ltd., Osaka, Japan

[21] Appl. No.: 09/163,121

[22] Filed: Sep. 29, 1998

[30] Foreign Application Priority Data

Sep. 30, 1997 [JP] Japan .................................. 9-265393

[51] Int. Cl.$^7$ .................................................. G02B 15/14
[52] U.S. Cl. .......................... 359/686; 359/676; 359/683
[58] Field of Search ........................... 359/676, 680–686, 359/689, 691

[56] References Cited

U.S. PATENT DOCUMENTS

| | | | |
|---|---|---|---|
| 4,666,257 | 5/1987 | Tanaka et al. | 350/427 |
| 4,673,258 | 6/1987 | Masumoto | 350/423 |
| 5,105,311 | 4/1992 | Tokumaru et al. | 359/686 |
| 5,872,659 | 2/1999 | Kohno | 359/683 |
| 5,892,626 | 4/1999 | Kohno | 359/676 |

*Primary Examiner*—Georgia Epps
*Assistant Examiner*—David N. Spector
*Attorney, Agent, or Firm*—Sidley & Austin

[57] ABSTRACT

A zoom lens system has four or five lens units with the optical powers being +/–/+/– or +/–/+/+/–, respectively, from the object side. The image side lens unit has a negative optical power and is movable, along with at least one other lens unit, in a zooming operation. The zoom lens system satisfies the following conditions: $0.6<LBw/fw<1.7$ and $0.6<|fN/fw|<1.7$, where LBw represents a back focus length at the shortest focal length condition; fw represents a focal length of the zoom lens system at the shortest focal length condition; and fN represents a focal length of the image side lens unit. The lens system can be employed with a solid state imaging device, and an optical low-pass filter and an infrared blocking filter can be positioned between the lens system and the imaging unit.

21 Claims, 6 Drawing Sheets

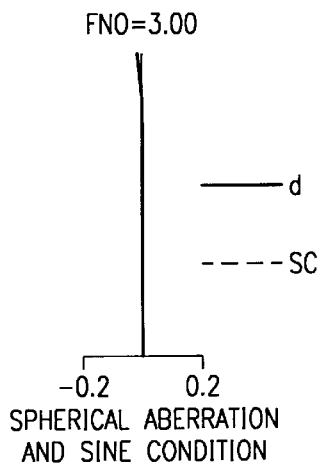
FIG. 6a  FIG. 6b  FIG. 6c
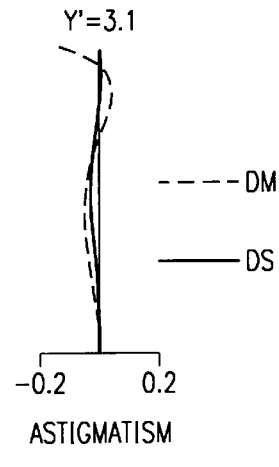
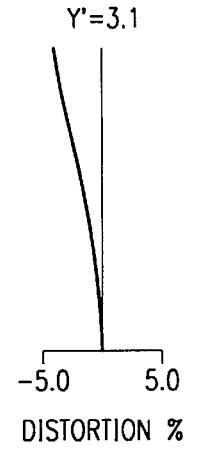
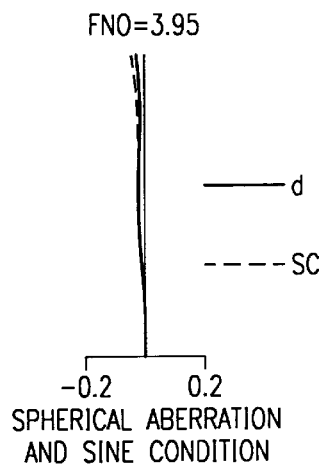
FIG. 6d  FIG. 6e  FIG. 6f
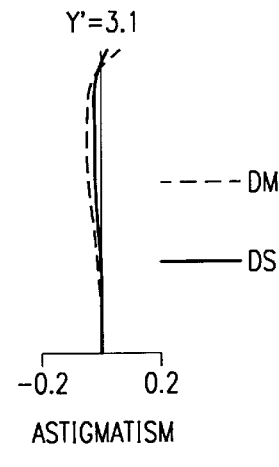
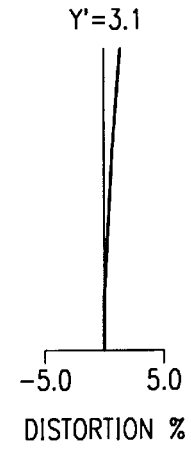
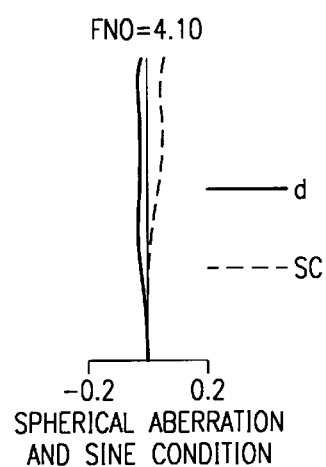
FIG. 6g  FIG. 6h  FIG. 6i
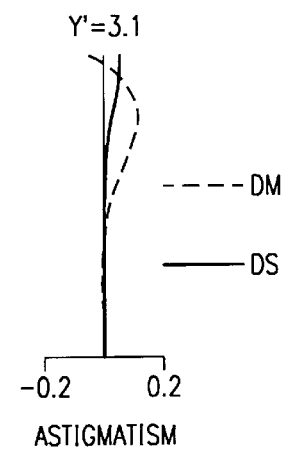
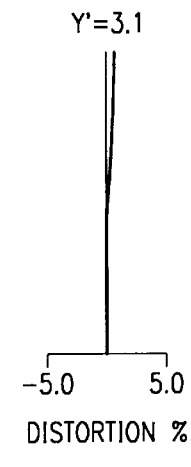

ZOOM LENS SYSTEM

This application is based on Japanese patent application No. 9-265393, filed Sep. 30, 1997, the entire contents of which are incorporated herein by reference.

FIELD OF THE INVENTION

The present invention relates to a zoom lens system which is used in a small-sized imaging optical system, and more particularly to a compact zoom lens system of a high variable magnification which is used in an imaging optical system of a digital input apparatus, e.g., a digital still camera or a digital video camera.

DESCRIPTION OF THE RELATED ART

Recently, with the increased use of personal computers, digital cameras (e.g., digital still cameras, digital video cameras, and the like; hereinafter, such a camera is referred to simply as a digital camera) which can easily transfer video information to a digital apparatus, are becoming popular at the private user level. It is expected that in the future such a digital camera will be widely employed as an input apparatus for video information.

Usually, the image quality of a digital camera depends on the number of pixels of a solid state imaging device, e.g., a CCD (charge coupled device). At present, most digital cameras for general consumer use employ a solid state imaging device of the so-called VGA class having about 330,000 pixel resolution. However, it is not deniable that the image quality of a camera of the VGA class is largely inferior to that of a conventional camera using a silver halide film. Thus, in the field of digital cameras for general consumer use, a camera of a high image quality and having a pixel resolution of 1,000,000 or higher is desired. Consequently, it is also desirable that the imaging optical system of such a digital camera satisfy a requirement of a high image quality.

Furthermore, it is desirable that these digital cameras for general consumer use are desired to perform magnification of an image, particularly optical magnification in which image deterioration is low in magnitude. Therefore, a zoom lens system for a digital camera should satisfy the requirements of a high variable magnification and a high image quality.

However, among zoom lens systems for digital cameras which have been proposed, most of the systems having a pixel resolution of 1,000,000 or higher are those in which an interchangeable lens for a single-lens reflex camera is used as it is or those for a large-sized digital camera for business. Therefore, such zoom lens systems are very large in size and high in production cost, and are not suitable for digital cameras for general consumer use.

By contrast, it may be contemplated that an imaging optical system of a lens shutter camera, which uses a silver halide film and in which compactness and variable magnification have recently noticeably advanced, is used as the imaging optical system of such a digital camera.

However, when an imaging optical system of a lens shutter camera is used as it is in a digital camera, the focal performance of a micro-lens disposed in front of the solid state imaging device of the digital camera cannot be sufficiently satisfied, thereby producing a problem in that the brightness in the center area of an image is largely different from that in the peripheral area of the image. Specifically, this problem is caused by the phenomenon that the exit pupil of an imaging optical system of a lens shutter camera is located in the vicinity of the image plane and hence the off-axis beams emitted from the imaging optical system are obliquely incident on the image plane. When the position of the exit pupil of an imaging optical system of a lens shutter camera of the prior art is separated from the image plane in order to solve the problem, the size of the whole imaging optical system is inevitably increased.

SUMMARY OF THE INVENTION

It is an object of the invention to provide a zoom lens system which is able to solve the above-discussed problem.

It is another object of the invention to provide a zoom lens system which is able to satisfy the requirements of high variable magnification and high-image quality.

It is a further object of the invention to provide a compact zoom lens system.

In order to attain the objects, the zoom lens system of the invention is characterized in that the system comprises: a plurality of lens units including at least one lens unit having positive optical power and at least one lens unit having negative optical power; wherein the lens unit which is closest to the image side has a negative optical power; wherein at least two lens units including the lens unit closest to the image side, are moved along the optical axis in a zooming operation; and wherein the system satisfies the following conditions:

$$0.6 < LBw / fw < 1.35$$

$$0.6 < |fN / fw| < 1.35$$

where $LBw$ represents a back focus length at the shortest focal length condition, $fw$ represents the focal length of the whole zoom lens system at the shortest focal length condition, and $fN$ represents a focal length of the negative lens unit which is closest to the object side.

In order to attain the objects, another zoom lens system in accordance with the invention is characterized in that the system comprises: a plurality of lens units arranged along an optical axis between and including an image side lens unit, which is closest to the image side of the zoom lens system, and an object side lens unit, which is closest to an object side of the zoom lens unit; the plurality of lens units including at least one lens unit having positive optical power and at least one lens unit having negative optical power; wherein the lens unit which is closest to the image side has a negative optical power; wherein, in a zooming operation from the shortest focal length condition to the longest focal length condition, at least two lens units, including the image side lens unit, are moved; and wherein the zoom lens system satisfies the following conditions:

$$0.6 < LBw / fw < 1.7$$

$$0.6 < |fN / fw| < 1.7$$

where $LBw$ represents a back focus at the shortest focal length condition, $fw$ represents the focal length of the whole zoom lens system at the shortest focal length condition, and fN represents the focal length of the negative lens unit which is closest to the object side.

In a presently preferred embodiment the image side lens unit and a lens unit which is adjacent to the image side lens unit are monotonically moved at a uniform rate toward the object side of the zoom lens system during a zooming operation.

The invention itself, together with further objects and attendant advantages, will be understood by reference to the following detailed description taken in conjunction with the accompanying drawings.

BRIEF DESCRIPTION OF THE DRAWINGS

FIGS. 6(a) to 6(i) are aberration diagrams of an example in accordance with the second embodiment;

In the following description, like parts are designated by like reference numbers throughout the several drawings.

DETAILED DESCRIPTION OF THE PREFERRED EMBODIMENTS

Hereinafter, preferred embodiments of the invention will be described with reference to the accompanying drawings.

In the specification, the term "power" means a quantity which is defined by the reciprocal of a focal length, and includes not only the deflection in the faces of media having refractive indices of different deflection functions, but also the deflection due to diffraction, the deflection due to the distribution of refractive index in a medium, and the like. Furthermore, the term "refractive power" means a quantity which belongs to the above-mentioned "power", and which is particularly due to a deflection function generated in an interface between media having different refractive indices.

Figure 1:
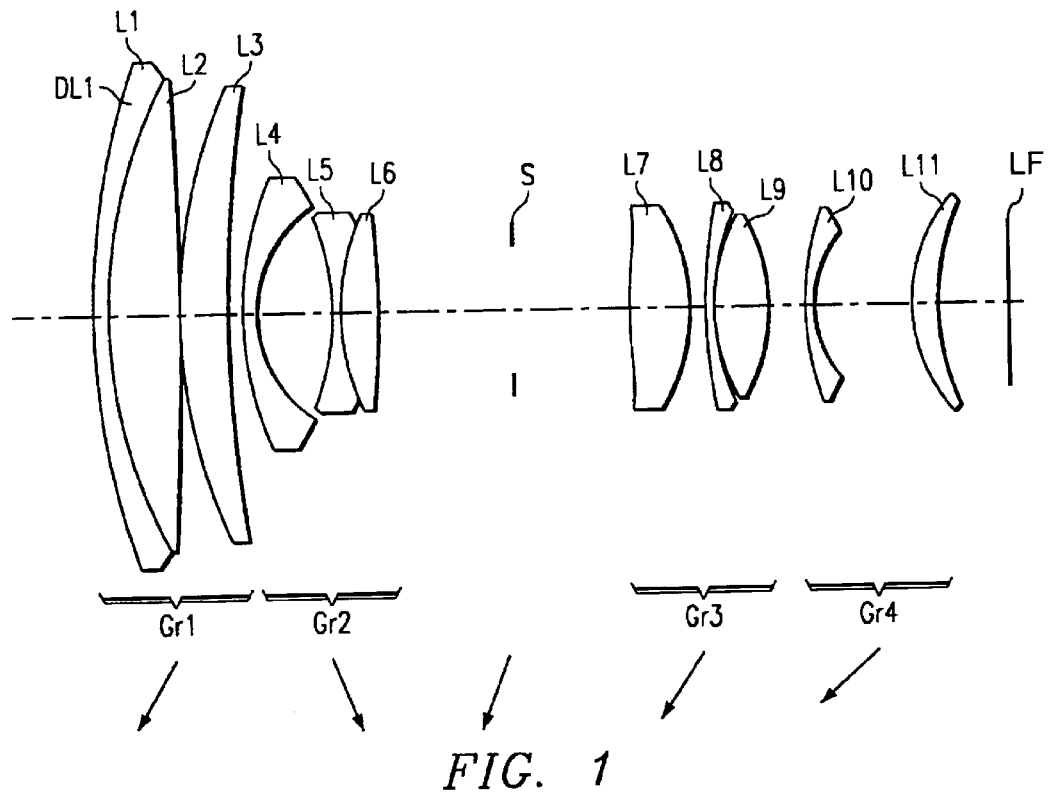
FIG. 1 is a cross sectional view of the lens arrangement of a first embodiment of a zoom lens system in accordance with the present invention.
Figure 2:
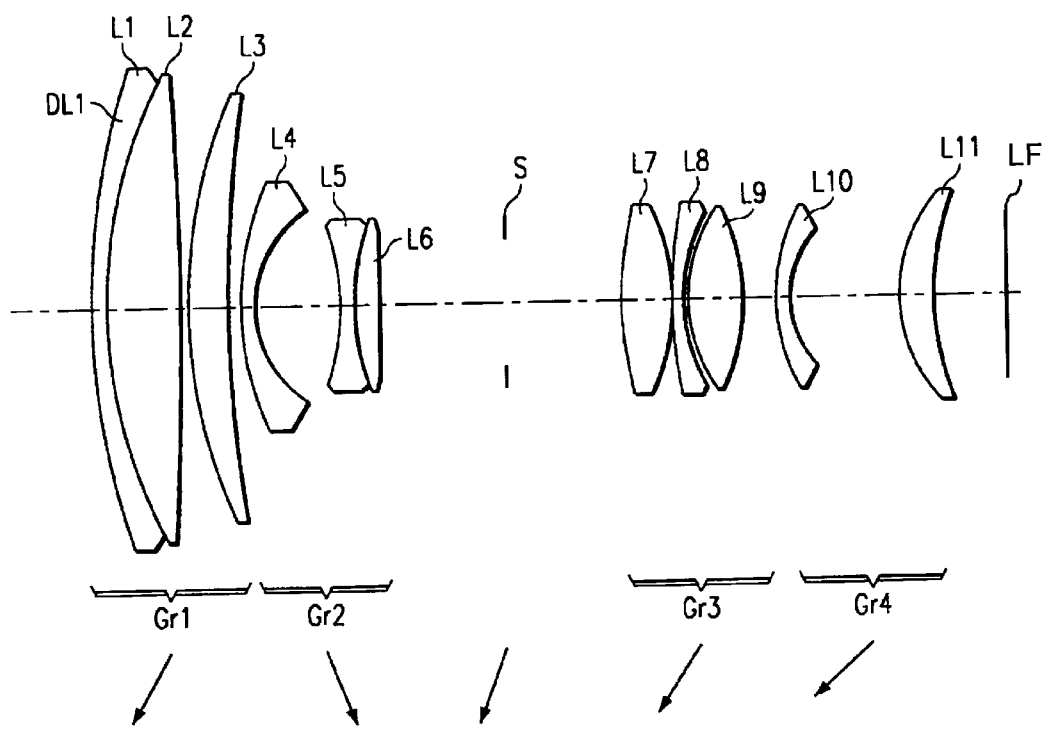
FIG. 2 is a cross sectional view of the lens arrangement of a second embodiment of a zoom lens system in accordance with the present invention.
Figure 3:
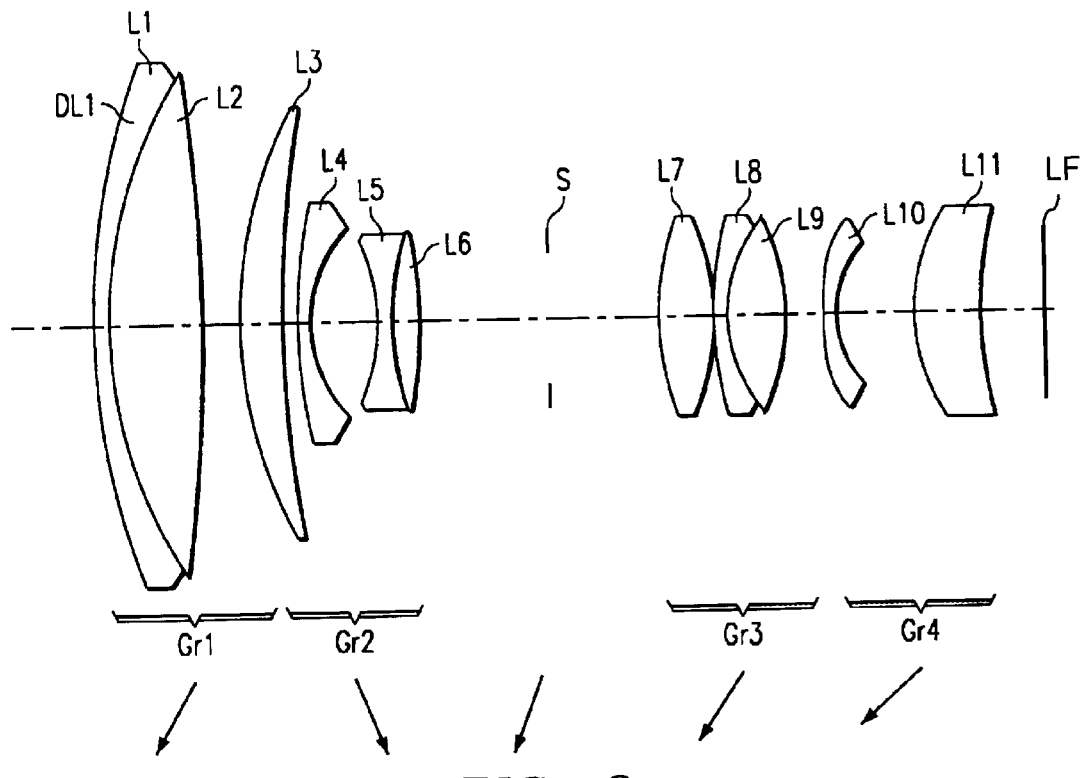
FIG. 3 is a cross sectional view of the lens arrangement of a third embodiment of a zoom lens system in accordance with the present invention.
Figure 4:
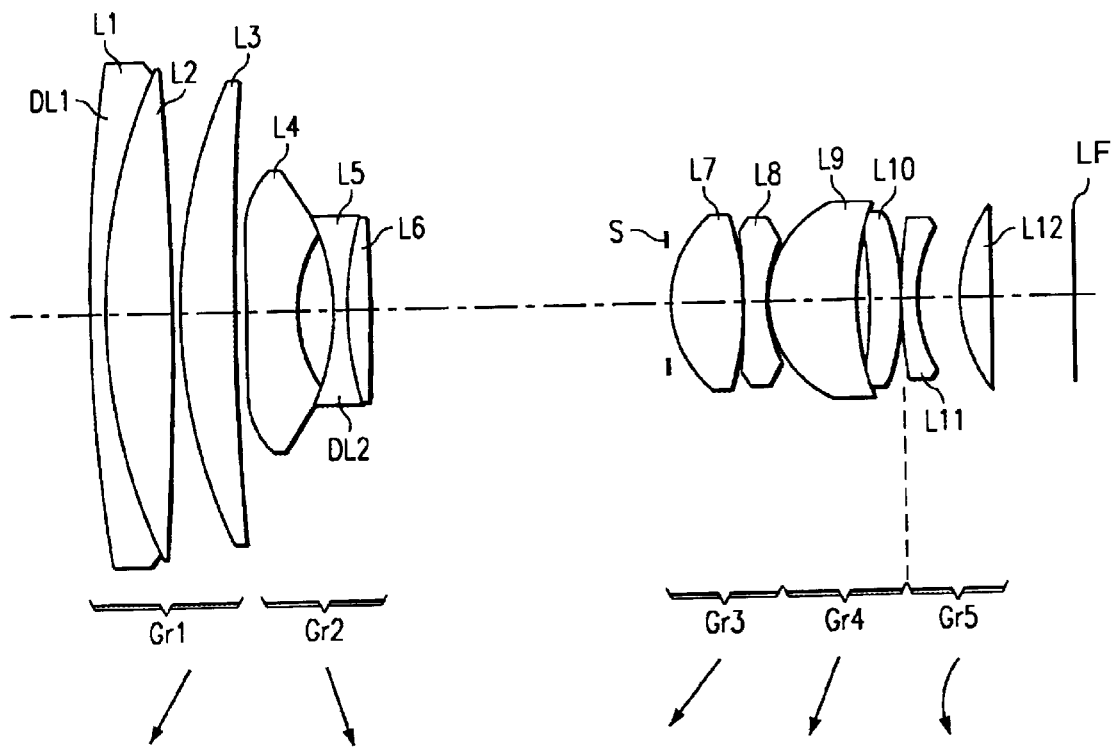
FIG. 4 is a cross sectional view of the lens arrangement of a fourth embodiment of a zoom lens system in accordance with the present invention.

FIGS. 1 to 4 are cross sectional views respectively showing the lens arrangements of the zoom lens systems of first to fourth embodiments of the present invention, at the shortest focal length condition. Each of the first, second, and third embodiments is a zoom lens system which is configured, along the optical axis in the sequence from the object side, by a first lens unit Gr1 having positive optical power, a second lens unit Gr2 having negative optical power, a third lens unit Gr3 having positive optical power, and a fourth lens unit Gr4 having negative optical power, and in which all of the lens units, including the fourth lens unit, are moved in a zooming operation. The fourth embodiment is a zoom lens system which is configured, in the sequence from the object side, by a first lens unit Gr1 having positive optical power, a second lens unit Gr2 having negative optical power, a third lens unit Gr3 having positive optical power, a fourth lens unit Gr4 having positive optical power, and a fifth lens unit Gr5 having negative optical power, and in which all of the lens units, including the fifth lens unit, are moved in a zooming operation. The arrows shown in the figures diagrammatically indicate the loci of movement of the lens units Gr1 to Gr3, a diaphragm S, and a low-pass filter LF in a zooming operation from the shortest focal length condition to the longest focal length condition.

Each of the zoom lens systems of the first, second, and third embodiments is configured, along the optical axis in the sequence from the object side, by: the first lens unit Gr1 comprising a doublet lens element DL1, composed of a positive meniscus lens element L1 having a convex surface on its object side and a bi-convex positive lens element L2, and a positive meniscus lens element L3 having a convex surface on its object side; the second lens unit Gr2 comprising a negative meniscus lens element L4 having a convex surface on its object side, a bi-concave negative lens element L5, and a bi-convex positive lens element L6 (both faces of which are aspherical surfaces); the diaphragm S; the third lens unit Gr3 comprising a bi-convex positive lens element L7 (the front side of which is an aspherical surface), a negative meniscus lens element L8 having a convex surface on its object side, and a bi-convex positive lens element L9; and the fourth lens unit Gr4 comprising a negative meniscus lens element L10 (both faces of which are aspherical surfaces) having a convex surface on its object side, and a positive meniscus lens element L11 having a convex surface on its object side. In a zooming operation from the shortest focal length condition to the longest focal length condition, the first lens unit Gr1, the diaphragm S, the third lens unit Gr3, and the fourth lens unit Gr4 are moved toward the object side, and the second lens unit Gr2 is moved toward the image side.

The zoom lens system of the fourth embodiment is configured along the optical axis in the sequence from the object side, by: the first lens unit Gr1 comprising a doublet lens element DL1 composed of a positive meniscus lens element L1 having a convex surface on its object side and a bi-convex positive lens element L2, and a positive meniscus lens element L3 having a convex surface on its object side; the second lens unit Gr2 comprising a bi-concave negative lens element L4 (both faces of which are aspherical surfaces), and a doublet lens element DL2, composed of a bi-concave negative lens element L5 and a bi-convex positive lens element L6; the diaphragm S; the third lens unit Gr3 comprising a bi-convex positive lens element L7, and a bi-concave negative lens element L8; the fourth lens unit Gr4 comprising a positive meniscus lens element L9 having a convex surface on its object side, and a bi-convex positive lens element L10 (both faces of which are aspherical surfaces); and the fifth lens unit Gr5 comprising a negative meniscus lens element L11 having a convex surface on its object side, and a positive meniscus lens element L12 having a convex surface on its object side and being spaced from L11. In a zooming operation from the shortest focal length condition to the longest focal length condition, the first lens unit Gr1, the diaphragm S, the third lens unit Gr3, and the fourth lens unit Gr4 are moved toward the object side, the second lens unit Gr2 is moved toward the image side, and the fifth lens unit Gr5 is first moved toward the object side and then is moved toward the image side.

Hereinafter, conditions to be satisfied by the zoom lens systems of the embodiments will be described. It is not required to simultaneously satisfy all of the following conditions.

Preferably, the zoom lens systems of the embodiments satisfy the condition defined by the range of the following conditional expression (1):

$$0.6 < LBw/fw < 1.7 \qquad (1)$$

where

LBw represents the back focus at the shortest focal length condition, and fw represents the focal length of the whole zoom lens system at the shortest focal length condition.

The above conditional expression defines a ratio of the back focus at the shortest focal length condition to the focal length of the whole zoom lens system at the shortest focal length condition, and is used for suitably setting the powers of the lens units, for balancing aberrations with the degrees of the powers, and for ensuring a space for disposing components, such as an optical low-pass filter and an infrared blocking filter, which are required for an imaging optical system of a digital camera. When the upper limit of the range of conditional expression (1) is exceeded, the back focus becomes longer than required so that the size of the whole optical system is increased. Furthermore, the power of the negative lens unit, which is closer to the object side than the negative lens unit closest to the image side, becomes too strong, and hence a negative distortion aberration at the shortest focal length condition increases excessively, with the result that the optical performance cannot be maintained. By contrast, when the ratio of LBw/fw is less than the lower limit of the range of conditional expression (1), the back focus becomes shorter than required so that it is difficult to dispose components, such as an optical low-pass filter and an infrared blocking filter, which are required for an imaging optical system of a digital camera. Furthermore, the power of the negative lens unit, which is closer to the object side than the negative lens unit closest to the image side, becomes too weak, thereby requiring the diameter of the front lens unit Gr1 to be increased in order to ensure the marginal illumination at the shortest focal length condition.

The range of conditional expression (1) is most effective in the case where the powers in the whole zoom lens system are arranged from the object side in the sequence of positive, negative, positive, and negative. In the case of another power arrangement (for example, positive, negative, positive, positive, and negative), it is more preferable that the range of the following conditional expression (1a) or (1b), within the range of conditional expression (1), be satisfied. When a lens unit which is adjacent to the negative lens unit closest to the image side is not moved in a zooming operation, the range of conditional expression (1b) must be satisfied:

$$0.6 < LBw/fw < 1.6 \qquad (1a)$$

$$0.6 < LBW/fw < 1.35 \qquad (1b)$$

Preferably, the zoom lens system of each of the embodiments satisfies the condition defined by the range of the following conditional expression (2):

$$0.6 < |fN/fw| < 1.7 \qquad (2)$$

where fN represents a focal length of the negative lens unit which is closest to the object side, and fw represents the focal length of the whole zoom lens system at the shortest focal length condition.

The conditional expression (2) defines a ratio of the focal length of the negative lens unit, which is closest to the object side, to the focal length at the shortest focal length condition, and is used for balancing the total length of the optical system with the optical performance. When the upper limit of the range of conditional expression (2) is exceeded, the focal length of the second lens unit increases, or in other words the power of the second lens unit becomes too weak. Therefore, the total length at the shortest focal length condition is extended, and the diameter of the front lens unit Gr1 must be increased in order to ensure the marginal illumination at the shortest focal length condition. By contrast, when the ratio of fN/fw is less than the lower limit of the range of conditional expression (2), the focal length of the second lens unit decreases, or in other words the power of the second lens unit becomes too strong. Therefore, a negative distortion aberration in the short focal length side increases extremely, with the result that it is difficult to maintain excellent optical performance.

The range of conditional expression (2) is most effective in the case where the optical powers in the whole zoom lens system are arranged from the object side in the sequence of positive, negative, positive, and negative. In the case of another power arrangement (for example, positive, negative, positive, positive, and negative), it is more preferable that the range of the following conditional expression (2a) or (2b), within the range of conditional expression (2), be satisfied. When a lens unit which is adjacent to the negative lens unit closest to the image side is not moved in a zooming operation, the range of conditional expression (2b) must be satisfied:

$$0.6 < |fN/fw| < 1.6 \qquad (2a)$$

$$0.6 < |fN/fw| < 1.35 \qquad (2b)$$

where fN and fw are as defined above.

Preferably, the zoom lens systems of the embodiments satisfy the condition defined by the range of the following conditional expression (3):

$$1 < \beta \times T/\beta \times W < 1.5 \qquad (3)$$

where

βxT represents a lateral magnification of the lens unit closest to the image side, at the longest focal length condition, and βxW represents a lateral magnification of the lens unit closest to the image side, at the shortest focal length condition.

The conditional expression (3) defines the burden of magnification change of the negative lens unit which is closest to the image side, in a change from the shortest focal length condition to the longest focal length condition. When the upper limit of the range of conditional expression (3) is exceeded, the burden of magnification change becomes too large. Therefore, aberration variation due to magnification change increases, so that it is difficult to ensure a high variable magnification. When the ratio βxT/βxW is less than the lower limit of the range of conditional expression (3), the burden of magnification change on the other lens units of the zoom lens system becomes too large. Therefore, the movement amounts of the lens units due to magnification change increase, and the size of the optical system must be made larger.

Preferably, the zoom lens systems of the embodiments satisfy the condition defined by the range of the following conditional expression (4):

$$4.0 < |fP/fw| < 9.5 \qquad (4)$$

where fP represents a focal length of the positive lens unit which is closest to the object side among positive lens units, and fw represents the focal length of the whole zoom lens system at the shortest focal length condition.

The conditional expression (4) defines a ratio of the focal length of the lens unit closest to the object side to the focal length of the whole system at the shortest focal length condition, and is used for balancing the total length and the diameter of the front lens with the optical performance. When the upper limit of the range of conditional expression (4) is exceeded, the focal length of the first lens unit increases, or in other words the power of the first lens unit becomes too weak. Therefore, the movement amount of the first lens unit in magnification change becomes too large. This causes the total length at the longest focal length condition to be increased, and the diameter of the front lens to be increased. When |fP/fw| is less than the lower limit of the range of conditional expression (4), the focal length of the first lens unit decreases, or in other words the power of the first lens unit becomes too strong. Therefore, the movement amount of the first lens unit decreases. This is advantageous in miniaturization. However, an aberration in the first lens unit, particularly a spherical aberration in the long focal length side is generated, with the result that it is difficult to maintain excellent optical performance.

Preferably, the zoom lens systems of the embodiments satisfy the condition defined by the range of the following conditional expression (5):

$$3.5 < \beta NT/\beta NW < 7.5 \qquad (5)$$

where

βNT represents the lateral magnification of the negative lens unit, which is closest to the object side among the negative lens units, at the longest focal length condition, and βNW represents the lateral magnification of the negative lens unit, which is closest to the object side among the negative lens units, at the shortest focal length condition.

The conditional expression (5) defines the burden of magnification change of the negative lens unit which is closest to the object side among the negative lens units, in a change from the shortest focal length condition to the longest focal length condition. When the upper limit of the range of conditional expression (5) is exceeded, the movement amount of the negative lens unit which is closest to the object side among the negative lens units becomes too large. Therefore, the lens diameter (the diameter of the front lens) of the first lens unit, particularly the diameter of the front lens at the longest focal length condition increases, and hence this is not preferable. By contrast, when the ratio of βNT/βNW is less than the lower limit of range of conditional expression (5), magnification change must be conducted by another lens unit of a small capacity for the burden of magnification change. Therefore, aberration variation due to magnification change increases, so that it is difficult to ensure a high variable magnification.

Preferably, the zoom lens systems of the embodiments satisfy the condition defined by the range of the following conditional expression (6):

$$7.5 < img * R < 9.8 \qquad (6)$$

where img represents a diameter of an image circle, and

R represents an effective diameter of an optical path of the lens face closest to the image side in the optical system.

The conditional expression (6) is set in order to suitably maintain the size of the optical system, aberrations, and conditions peculiar to an imaging optical system of a digital camera. In a solid state imaging device (CCD), a micro-lens is usually disposed in front of each light receiving device so as to enhance the focal property. In order to exhibit the property of a micro-lens, light flux must be incident with an angle which is substantially perpendicular to the optical axis of the micro-lens. Therefore, it is desirable that an imaging optical system be approximately telecentric. When the upper limit of the range of conditional expression (6) is exceeded, in the optical system the approximate telecentric state with respect to the image side becomes stronger than required so that a negative distortion aberration at the shortest focal length condition increases and the image plane is largely curved toward the underside. By contrast, when the value of img*R is less than the lower limit of the range of conditional expression (6), it is difficult to satisfy the approximate telecentric state. Even when the approximate telecentric state is satisfied, the back focus becomes larger than required, thereby causing the size of the optical system itself to be increased.

In the zoom lens systems of the embodiments, when an aspherical surface is disposed in the negative lens unit which is closest to the object side among the negative lens units, an aberration can be further satisfactorily corrected. In this case, preferably, the aspherical surface disposed in any lens element of the negative lens unit which is closest to the object side among the negative lens units satisfies the condition defined by the range of the following conditional expression (7), at a height of the maximum effective diameter of an optical path *0.7:

$$-2.5 < (|x(H)| - |x0(H)|)/(Co(N' - N) * fN_{imag}) < 0 \qquad (7)$$

where

Co represents a reference curvature of the aspherical surface,

N represents a refractive index of the medium, which is on the object side with respect to the aspherical surface, to the d line, N' represents a refractive index of the medium, which is on the image side with respect to the aspherical surface, to the d line, H represents a height in a direction perpendicular to the optical axis, x(H) represents a displacement amount at the height H of the aspherical surface along the optical axis, x0(H) represents a displacement amount at the height H of the reference spherical surface along the optical axis, and fN$_{imag}$ represents a focal length of the negative lens unit which is closest to the image side among the lens units.

The conditional expression (7) means that the aspherical surface has a shape which weakens the power of the lens unit which is closest to the object side among the negative lens units, and is used for correcting a distortion aberration at the shortest focal length condition and the image plane from the shortest focal length condition to the middle focal length region. When the upper limit of the range of conditional expression (7) is exceeded, a negative distortion aberration at the shortest focal length condition increases and the image plane from the shortest focal length condition to the middle focal length region is largely curved toward the underside. When the value is less than the lower limit of the range of conditional expression (7), a positive distortion aberration at the shortest focal length condition increases and the image plane from the shortest focal length condition to the middle focal length region is largely curved toward the overside.

In the case where the zoom lens system is configured in the optical power arrangement of the sequence of positive, negative, positive, and negative, the disposition of an aspherical surface in the fourth lens unit, which is the final negative lens unit, enables an aberration to be corrected more satisfactorily. Preferably, one of the aspherical surfaces in the final negative lens unit satisfies the following conditional expression (7a), at a height of the maximum effective diameter of an optical path *0.7:

$$-0.5 < (|x(H)| - |x0(H)|)/(Co(N' - N)*f4) < 0 \quad (7a)$$

where:

Co represents a reference curvature of the aspherical surface,

N represents a refractive index of the medium, which is on the object side with respect to the aspherical surface, to the d line, N' represents a refractive index of the medium, which is on the image side with respect to the aspherical surface, to the d line, H represents a height in a direction perpendicular to the optical axis, x(H) represents a displacement amount at the height H of the aspherical surface along the optical axis, x0(H) represents a displacement amount at the height H of the reference spherical surface along the optical axis, and f4 represents a focal length of the fourth lens unit.

The conditional expression (7a) means that the aspherical surface has a shape which weakens the negative power of the fourth lens unit, and is used for correcting a distortion aberration at the shortest focal length condition and a coma aberration from the middle focal length region to the longest focal length condition. When the upper limit of the range of conditional expression (7a) is exceeded, a negative distortion aberration at the shortest focal length condition increases, and upward coma from the middle focal length region to the longest focal length condition is generated. By contrast, when the value is less than the lower limit of the range of conditional expression (7a), a positive distortion aberration at the shortest focal length condition increases and downward coma from the middle focal length region to the longest focal length condition is generated.

In the zoom lens systems of the embodiments, the disposition of an aspherical surface in a positive lens unit enables an aberration to be corrected more satisfactorily. In this case, preferably, an aspherical surface disposed in one of the positive lens units satisfies the condition defined by the range of the following conditional expression (8), at a height of the maximum effective diameter of an optical path *0.7:

$$-0.5 < (|x(H)| - |x0(H)|)/(Co(N' - N)*fP) < 0 \quad (8)$$

where

Co represents a reference curvature of the aspherical surface,

N represents a refractive index of the medium, which is on the object side with respect to the aspherical surface, to the d line, N' represents a refractive index of the medium, which is on the image side with respect to the aspherical surface, to the d line, H represents a height in a direction perpendicular to the optical axis, x(H) represents a displacement amount at the height H of the aspherical surface along the optical axis, x0(H) represents a displacement amount at the height H of the reference spherical surface along the optical axis, and fP represents a focal length of the positive lens unit in which the aspherical surface is disposed.

The conditional expression (8) means that the aspherical surface has a shape which weakens the positive power of the positive lens unit, and is used for correcting a spherical aberration from the middle focal length region to the longest focal length condition. When the upper limit of the range of conditional expression (8) is exceeded, a spherical aberration is largely curved toward the underside. Therefore, this is not preferable. By contrast, when the value is less than the lower limit of the range of conditional expression (8), a spherical aberration is largely curved toward the overside. Therefore, this is not preferable.

Hereinafter, specific examples of the first through the fourth embodiments will be described with reference to construction data, aberration diagrams, etc.

Examples 1 to 4 correspond to the first through the fourth embodiments respectively. Thus, the lens arrangement diagrams of FIGS. 1–4 indicate the lens configurations of the Examples 1–4, respectively.

In the Examples, ri (i=1, 2, 3 . . . ) indicates the radius of curvature of an i-th surface, counted from the object side; di (i=1, 2, 3 . . . ) indicates an i-th axial surface separation, counted from the object side; and Ni (i=1, 2, 3 . . . ) and vi (i=1, 2, 3 . . . ) indicate the refractive index and the Abbe number of an i-th lens element, counted from the object side, to the d line. Furthermore, f indicates the focal length of the whole system, and FNO indicates the F number. In the Examples, the focal length f of the whole system, the F number FNO, and the air space (axial surface separation) between the lens units correspond in the sequence from the left side, to the values at the shortest focal length condition (W), the middle focal length (M), and the longest focal length condition (T), respectively.

In the Examples, a surface in which the radius of curvature ri is marked with "*" indicates a refractive optical surface having an aspherical shape, which is defined by the following expression showing the shape of the aspherical surface.

$$X(H) = CH^2 / \{1 + (1 - \epsilon \cdot C^2 \cdot H^2)^{1/2}\} + \sum Ai \cdot Hi \quad \text{(AS)}$$

where

H represents a height in a direction perpendicular to the optical axis,

X(H) represents a displacement amount at the height H along the optical axis (with respect to the surface vertex), C represents a paraxial curvature, $\epsilon$ represents a quadric surface parameter, Ai represents an i-th order aspherical coefficient, and Hi represents a symbol indicating an i-th power of H.

TABLE 1

[Example 1]
f = 5.1~15.8~49.0
FNO = 3.00~3.95~4.10

| Radius of Curvature | Axial Distance | Refractive Index | Abbe Number |
|---|---|---|---|
| r1 = 23.713 | | | |
| | d1 = 0.500 | N1 = 1.84666 | ν1 = 23.82 |
| r2 = 17.067 | | | |
| | d2 = 2.231 | N2 = 1.48749 | ν2 = 70.44 |
| r3 = −171.370 | | | |
| | d3 = 0.080 | | |
| r4 = 18.337 | | | |
| | d4 = 1.503 | N3 = 1.61800 | ν3 = 63.39 |
| r5 = 43.528 | | | |
| | d5 = 0.500~9.315~16.973 | | |
| r6 = 10.340 | | | |
| | d6 = 0.450 | N4 = 1.75450 | ν4 = 51.57 |
| r7 = 3.856 | | | |
| | d7 = 2.578 | | |
| r8 = −7.074 | | | |
| | d8 = 0.250 | N5 = 1.75450 | ν5 = 51.57 |
| r9 = 7.273 | | | |
| | d9 = 0.043 | | |
| r10* = 6.117 | | | |
| | d10 = 1.211 | N6 = 1.75000 | ν6 = 25.14 |
| r11* = −56.671 | | | |
| | d11 = 4.405~3.528~0.405 | | |
| r12 = ∞ | | | |
| | d12 = 3.827~0.270~0.270 | | |
| r13* = 13.423 | | | |
| | d13 = 1.921 | N7 = 1.60311 | ν7 = 60.74 |
| r14 = −6.338 | | | |
| | d14 = 0.581 | | |
| r16 = 6.256 | | | |
| | d16 = 0.080 | | |
| r17 = 5.628 | | | |
| | d17 = 1.723 | N9 = 1.48749 | ν9 = 70.44 |
| r18 = −5.998 | | | |
| | d18 = 1.393~1.086~0.250 | | |
| r19* = 12.880 | | | |
| | d19 = 0.250 | N10 = 1.75450 | ν10 = 51.57 |
| r20* = 3.594 | | | |
| | d20 = 3.246 | | |
| r21 = 5.362 | | | |
| | d21 = 0.859 | N11 = 1.59270 | ν11 = 35.45 |
| r22 = 7.434 | | | |

[Aspherical Coefficient]

r10

$\epsilon$ = 1.0000
A4 = −0.41558*10⁻³
A6 = −0.76742*10⁻⁴
A8 = −0.67755*10⁻⁶ r11

TABLE 1-continued

[Example 1]
f = 5.1~15.8~49.0
FNO = 3.00~3.95~4.10

$\epsilon$ = 1.0000
A4 = −0.16745*10⁻³
A6 = 0.39888*10⁻⁴
A8 = −0.92595*10⁻⁵ r13

$\epsilon$ = 1.0000
A4 = −0.32439*10⁻²
A6 = −0.14111*10⁻⁴
A8 = −0.16804*10⁻⁷
A10 = −0.61391*10⁻⁷ r19

$\epsilon$ = 1.0000
A4 = 0.35572*10⁻²
A6 = 0.58238*10⁻⁴
A8 = −0.28805*10⁻⁴ r20

$\epsilon$ = 1.0000
A4 = −0.28980*10⁻²
A6 = −0.21179*10⁻³
A8 = −0.56790*10⁻⁴

TABLE 2

[Example 2]
f = 5.1~15.8~49.0
FNO = 3.00~3.95~4.10

| Radius of Curvature | Axial Distance | Refractive Index | Abbe Number |
|---|---|---|---|
| r1 = 26.066 | | | |
| | d1 = 0.500 | N1 = 1.84666 | ν1 = 23.82 |
| r2 = 17.952 | | | |
| | d2 = 2.463 | N2 = 1.48749 | ν2 = 70.44 |
| r3 = −195.422 | | | |
| | d3 = 0.303 | | |
| r4 = 18.774 | | | |
| | d4 = 1.359 | N3 = 1.61800 | ν3 = 63.39 |
| r5 = 44.271 | | | |
| | d5 = 0.500~9.373~17.673 | | |
| r6 = 10.430 | | | |
| | d6 = 0.450 | N4 = 1.69680 | ν4 = 56.47 |
| r7 = 3.979 | | | |
| | d7 = 3.032 | | |
| r8 = −7.126 | | | |
| | d8 = 0.450 | N5 = 1.69680 | ν5 = 56.47 |
| r9 = 7.367 | | | |
| | d9 = 0.116 | | |
| r10* = 7.145 | | | |
| | d10 = 0.790 | N6 = 1.84666 | ν6 = 23.82 |
| r11* = 58.141 | | | |
| | d11 = 4.405~3.462~0.405 | | |
| r12 = ∞ | | | |
| | d12 = 4.157~0.270~0.270 | | |
| r13* = 7.538 | | | |
| | d13 = 1.794 | N7 = 1.54681 | ν7 = 50.52 |
| r14 = −8.295 | | | |
| | d14 = 0.085 | | |
| r15 = 14.723 | | | |
| | d15 = 0.400 | N8 = 1.84666 | ν8 = 23.82 |
| r16 = 5.620 | | | |
| | d16 = 0.191 | | |
| r17 = 5.326 | | | |
| | d17 = 1.964 | N9 = 1.48749 | ν9 = 70.44 |
| r18 = −7.077 | | | |
| | d18 = 1.253~1.096~0.250 | | |
| r19* = 11.982 | | | |
| | d19 = 0.450 | N10 = 1.77250 | ν10 = 49.77 |
| r20* = 4.112 | | | |

TABLE 2-continued

[Example 2]
f = 5.1~15.8~49.0
FNO = 3.00~3.95~4.10

|  |  |  |  |
|---|---|---|---|
|  | d20 = 3.875 |  |  |
| r21 = 5.667 |  |  |  |
|  | d21 = 1.143 | N11 = 1.50553 | ν11 = 59.00 |
| r22 = 9.421 |  |  |  |

[Aspherical Coefficient]

r10

$\epsilon = 1.0000$
$A4 = -0.44100*10^{-3}$
$A6 = -0.14918*10^{-3}$
$A8 = -0.11725*10^{-4}$ r11

$\epsilon = 1.0000$
$A4 = -0.59580*10^{-3}$
$A6 = -0.67687*10^{-4}$
$A8 = -0.18862*10^{-4}$ r13

$\epsilon = 1.0000$
$A4 = -0.26134*10^{-2}$
$A6 = -0.27543*10^{-4}$
$A8 = 0.21388*10^{-5}$
$A10 = -0.18519*10^{-7}$ r19

$\epsilon = 1.0000$
$A4 = 0.36437*10^{-2}$
$A6 = 0.21687*10^{-3}$
$A8 = -0.26846*10^{-4}$ r20

$\epsilon = 1.0000$
$A4 = 0.38588*10^{-2}$
$A6 = 0.41681*10^{-3}$
$A8 = -0.35432*10^{-4}$

TABLE 3

[Example 3]
f = 5.1~15.8~49.0
FNO = 3.00~3.95~4.10

| Radius of Curvature | Axial Distance | Refractive Index | Abbe Number |
|---|---|---|---|
| r1 = 25.782 |  |  |  |
|  | d1 = 0.500 | N1 = 1.84787 | ν1 = 27.93 |
| r2 = 16.353 |  |  |  |
|  | d2 = 2.960 | N2 = 1.50343 | ν2 = 68.21 |
| r3 = −72.101 |  |  |  |
|  | d3 = 1.323 |  |  |
| r4 = 14.971 |  |  |  |
|  | d4 = 1.422 | N3 = 1.48749 | ν3 = 70.44 |
| r5 = 35.704 |  |  |  |
|  | d5 = 0.500~8.316~14.829 |  |  |
| r6 = 14.960 |  |  |  |
|  | d6 = 0.450 | N4 = 1.75450 | ν4 = 51.57 |
| r7 = 4.355 |  |  |  |
|  | d7 = 2.296 |  |  |
| r8 = −5.941 |  |  |  |
|  | d8 = 0.450 | N5 = 1.75450 | ν5 = 51.57 |
| r9 = 8.616 |  |  |  |
|  | d9 = 0.106 |  |  |
| r10* = 8.175 |  |  |  |
|  | d10 = 0.840 | N6 = 1.79850 | ν6 = 22.60 |
| r11* = −33.928 |  |  |  |
|  | d11 = 4.405~3.516~0.405 |  |  |
| r12 = ∞ |  |  |  |
|  | d12 = 3.825~0.270~0.270 |  |  |

TABLE 3-continued

[Example 3]
f = 5.1~15.8~49.0
FNO = 3.00~3.95~4.10

| | | | |
|---|---|---|---|
| r13* = 6.977 | | | |
| | d13 = 1.859 | N7 = 1.58300 | ν7 = 53.59 |
| r14 = −8.739 | | | |
| | d14 = 0.080 | | |
| r15 = 12.838 | | | |
| | d15 = 0.400 | N8 = 1.84764 | ν8 = 27.04 |
| r16 = 4.911 | | | |
| | d16 = 0.080 | | |
| r17 = 4.942 | | | |
| | d17 = 2.046 | N9 = 1.48749 | ν9 = 70.44 |
| r18 = −7.117 | | | |
| | d18 = 1.304~1.101~0.250 | | |
| r19* = 13.344 | | | |
| | d19 = 0.450 | N10 = 1.85000 | ν10 = 40.04 |
| r20* = 4.086 | | | |
| | d20 = 2.606 | | |
| r21 = 6.109 | | | |
| | d21 = 2.259 | N11 = 1.56057 | ν11 = 41.23 |
| r22 = 12.219 | | | |

[Aspherical Coefficient]

r10

$\epsilon = 1.0000$
$A4 = -0.65707*10^{-3}$
$A6 = -0.10951*10^{-3}$
$A8 = -0.24808*10^{-5}$ r11

$\epsilon = 1.0000$
$A4 = -0.62630*10^{-3}$
$A6 = -0.14190*10^{-4}$
$A8 = -0.10333*10^{-4}$ r13

$\epsilon = 1.0000$
$A4 = -0.25164*10^{-2}$
$A6 = -0.77037*10^{-5}$
$A8 = 0.13125*10^{-5}$
$A10 = 0.28986*10^{-6}$ r19

$\epsilon = 1.0000$
$A4 = 0.35408*10^{-2}$
$A6 = 0.24692*10^{-3}$
$A8 = -0.14905*10^{-4}$ r20

$\epsilon = 1.0000$
$A4 = 0.35055*10^{-2}$
$A6 = 0.38707*10^{-3}$
$A8 = -0.14513*10^{-4}$

TABLE 4

[Example 4]
f = 5.1~16.0~48.7
FNO = 2.90~3.95~4.10

| Radius of Curvature | Axial Distance | Refractive Index | Abbe Number |
|---|---|---|---|
| r1 = 65.256 |  |  |  |
|  | d1 = 0.60 | N1 = 1.848976 | ν1 = 33.14 |
| r2 = 24.009 |  |  |  |
|  | d2 = 2.50 | N2 = 1.487490 | ν2 = 70.44 |
| r3 = −148.204 |  |  |  |
|  | d3 = 0.27 |  |  |
| r4 = 21.665 |  |  |  |
|  | d4 = 2.10 | N3 = 1.611757 | ν3 = 58.21 |
| r5 = 103.583 |  |  |  |

TABLE 4-continued

[Example 4]
f = 5.1~16.0~48.7
FNO = 2.90~3.95~4.10

| | | | |
|---|---|---|---|
| r6* = −50.965 | d5 = 0.50~12.20~25.33 | | |
| r7* = 9.858 | d6 = 2.00 | N4 = 1.487490 | ν4 = 70.44 |
| r8 = −7.070 | d7 = 1.40 | | |
| r9 = 11.644 | d8 = 0.60 | N5 = 1.754500 | ν5 = 51.57 |
| r10 = −413.642 | d9 = 0.87 | N6 = 1.798500 | ν6 = 22.60 |
| r11 = ∞ | d10 = 11.95~4.45~0.50 | | |
| r12 = 4.401 | d11 = 0.10 | | |
| r13 = −12.170 | d12 = 2.83 | N7 = 1.660032 | ν7 = 55.45 |
| r14* = −35.405 | d13 = 0.10 | | |
| r15* = 5.191 | d14 = 0.81 | N8 = 1.836876 | ν8 = 31.24 |
| r16 = 4.187 | d15 = 0.10~1.73~2.27 | | |
| r17 = 9.593 | d16 = 3.42 | N9 = 1.502624 | ν9 = 60.53 |
| r18* = 86.461 | d17 = 0.62 | | |
| r19* = −16.471 | d18 = 1.04 | N10 = 1.749313 | ν10 = 24.30 |
| r20 = 17.938 | d19 = 0.10~1.50~2.51 | | |
| r21 = 5.209 | d20 = 0.60 | N11 = 1.814656 | ν11 = 26.57 |
| r22 = 5.845 | d21 = 1.68 | | |
| r23 = 50.689 | d22 = 1.18 | N12 = 1.487490 | ν12 = 70.44 |

[Aspherical Coefficient]

r6

$\epsilon = 1.0000$
$A4 = 0.16707*10^{-2}$
$A6 = -0.72678*10^{-4}$
$A8 = 0.38164*10^{-5}$
$A10 = -0.97108*10^{-7}$
$A12 = 0.13849*10^{-8}$ r7

$\epsilon = 1.0000$
$A4 = 0.21363*10^{-2}$
$A6 = -0.72211*10^{-4}$
$A8 = 0.13967*10^{-4}$
$A10 = -0.21014*10^{-5}$
$A12 = 0.17922*10^{-6}$ r14

$\epsilon = 1.0000$
$A4 = 0.21116*10^{-2}$
$A6 = 0.33909*10^{-5}$
$A8 = 0.15548*10^{-4}$
$A10 = -0.21060*10^{-5}$
$A12 = 0.44257*10^{-7}$ r15

$\epsilon = 1.0000$
$A4 = 0.86400*10^{-3}$
$A6 = 0.12827*10^{-3}$
$A8 = 0.31963*10^{-4}$
$A10 = -0.12613*10^{-5}$
$A12 = -0.23114*10^{-7}$ r18

$\epsilon = 1.0000$
$A4 = -0.28615*10^{-2}$

TABLE 4-continued

[Example 4]
f = 5.1~16.0~48.7
FNO = 2.90~3.95~4.10

$A6 = -0.34293*10^{-3}$
$A8 = 0.25942*10^{-4}$
$A10 = -0.41886*10^{-6}$
$A12 = -0.72680*10^{-8}$ r19

Figure 5A:
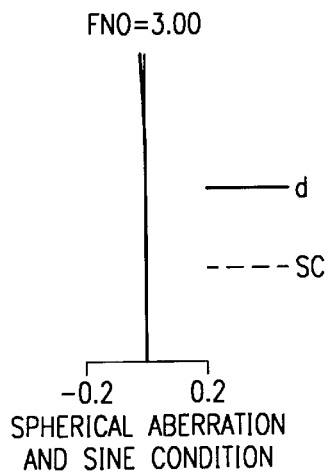
FIGS. 5(a) to 5(i) are aberration diagrams of an example in accordance with the first embodiment.
Figure 5B:
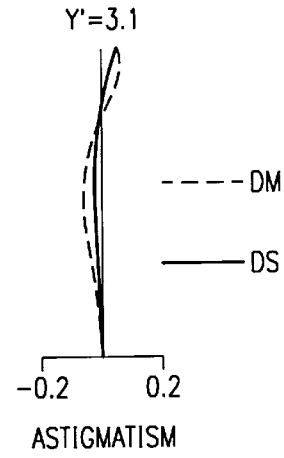
Figure 5C:
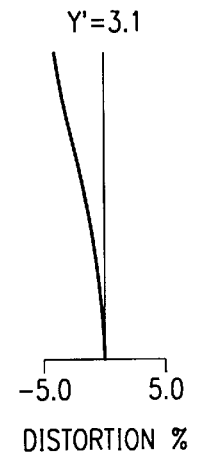
Figure 5D:
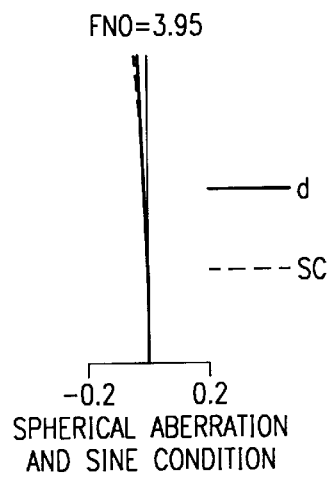
Figure 5E:
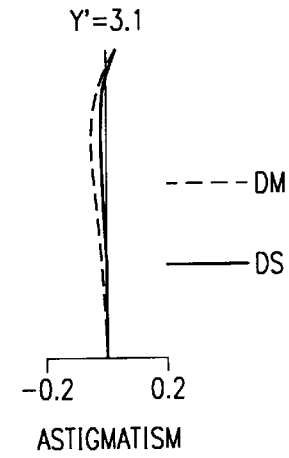
Figure 5F:
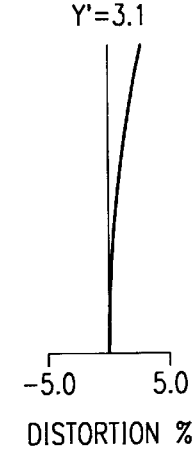
Figure 5G:
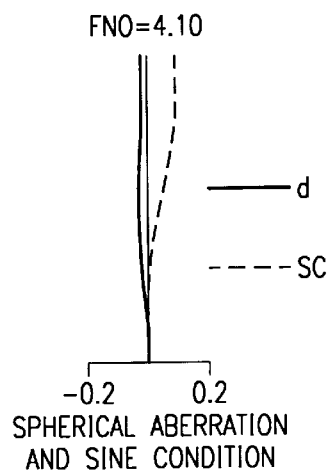
Figure 5H:
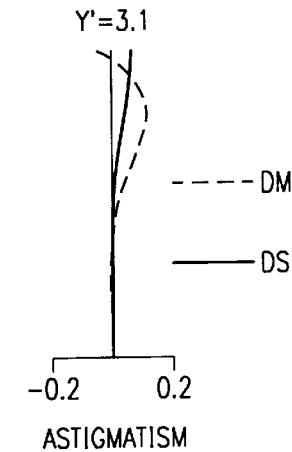
Figure 5J:
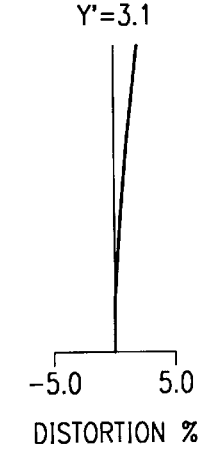
Figure 7A:
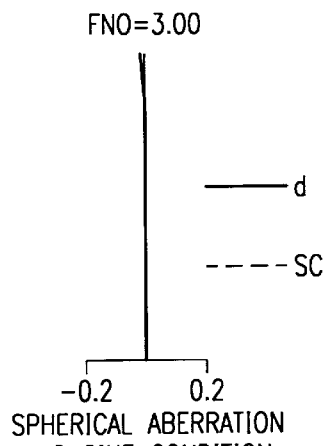
FIGS. 7(a) to 7(i) are aberration diagrams of an example in accordance with the third embodiment.
Figure 7B:
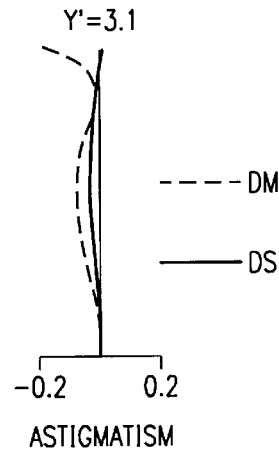
Figure 7C:
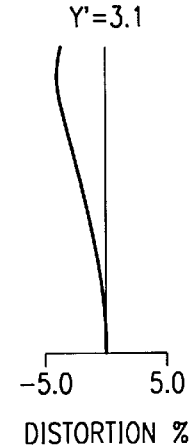
Figure 7D:
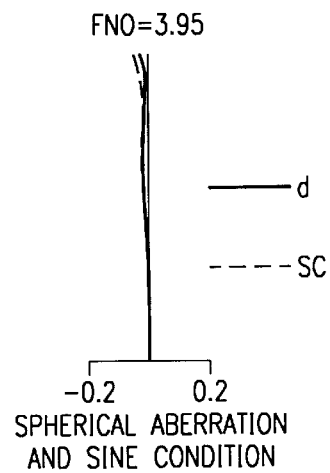
Figure 7E:
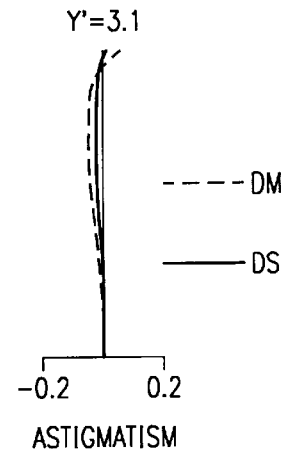
Figure 7F:
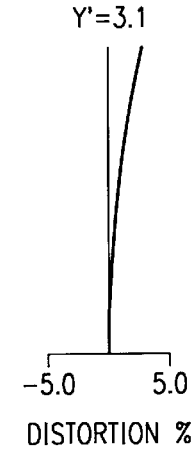
Figure 7G:
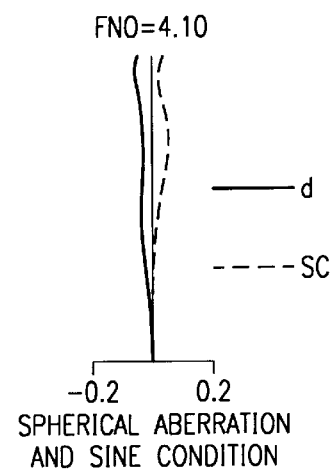
Figure 7H:
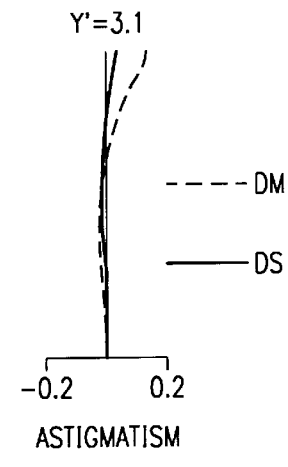
Figure 7I:
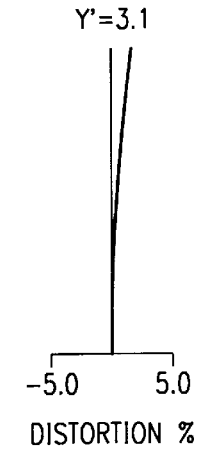
Figure 8A:
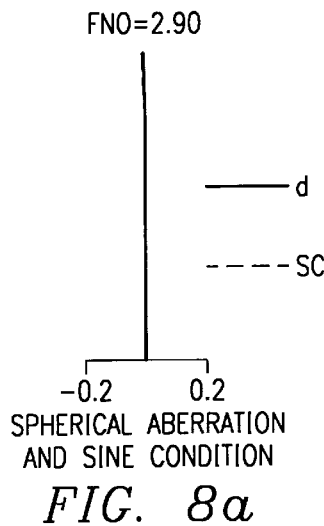
FIGS. 8(a) to 8(i) are aberration diagrams of an example in accordance with the fourth embodiment.
Figure 8B:
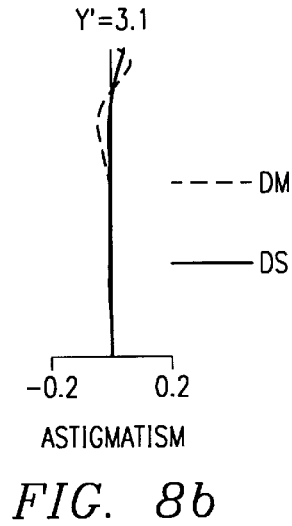
Figure 8C:
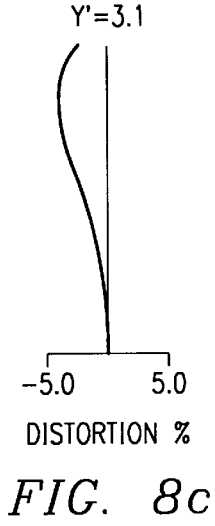
Figure 8D:
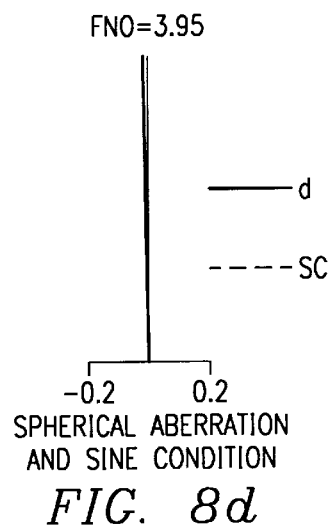
Figure 8E:
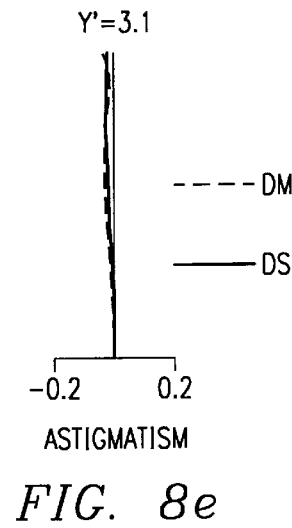
Figure 8F:
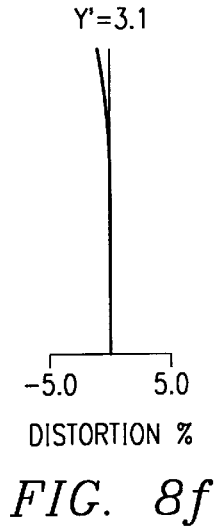
Figure 8G:
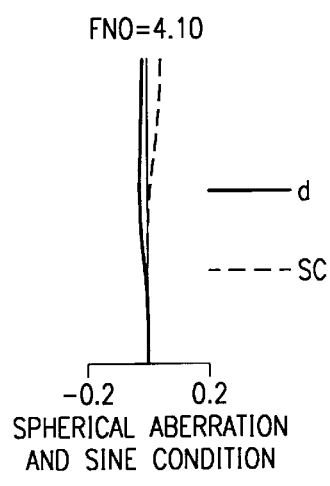
Figure 8H:
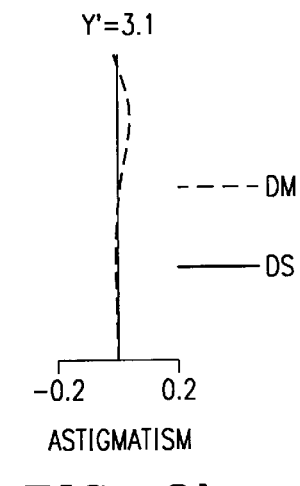
Figure 8I:
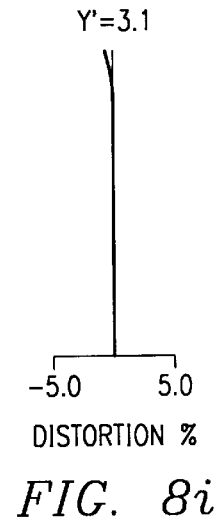

$\epsilon = 1.0000$
$A4 = -0.16348*10^{-2}$
$A6 = -0.19588*10^{-3}$
$A8 = -0.25465*10^{-4}$
$A10 = 0.39059*10^{-6}$
$A12 = 0.38164*10^{-8}$ FIGS. 5(a) to 5(i) are aberration diagrams corresponding to Example 1. FIGS. 6(a) to 6(i) are aberration diagrams corresponding to Example 2. FIGS. 7(a) to 7(i) are aberration diagrams corresponding to Example 3. FIGS. 8(a) to 8(i) are aberration diagrams corresponding to Example 4. Each of the figures having a suffix of "(a)", "(d)", or "(g)" is a spherical aberration diagram; each of the figures having a suffix of "(b)", "(e)", or "(h)" is an astigmatism diagram; and each of the figures having a suffix of "(c)", "(f)", or "(i)" is a distortion aberration diagram. Of the aberration diagrams, those with a suffix of "(a)", "(b)", or "(c)" represent aberrations of the optical system corresponding to the shortest focal length condition; those with a suffix of "(d)", "(e)", or "(f)" represent aberrations corresponding to the middle focal length condition; and those with a suffix of "(g)", "(h)", or "(i)" represent aberrations corresponding to the longest focal length condition.

In the spherical aberration diagrams, the solid line d indicates an amount of a spherical aberration with respect to the d line and SC indicates an amount of deviation from a sine condition. In the astigmatism diagrams, the solid line DS indicates the sagittal plane and the broken line DM indicates the meridional plane. The ordinates of the spherical aberration diagrams indicate the F number of light beams, and those of the astigmatism diagrams and the distortion aberration diagrams indicate the maximum image height Y'.

Values corresponding to the conditions of the Examples are listed in Table 5 below. In Table 5, Hmax indicates the maximum effective diameter.

TABLE 5

| [Example 1] | |
|---|---|
| (1) LBw/fw: | 0.83 |
| (2) \|fN/fw\|: | 0.94 |
| (3) β × T/β × W: | 1.35 |
| (4) \|fP/fw\|: | 5.5 |
| (5) βNT/βNW: | 6.6 |
| (6) img*R: | 8.4 |
| (7) (\|x(H)\| − \|x0(H)\|)/(Co(N' − N)*fN) | |
| r10 | |
| 0.70Hmax: | 0.00802 |
| r11 | |
| 0.70Hmax: | −0.01339 |
| r19 | |
| 0.70Hmax: | −0.04332 |
| r20 | |
| 0.70Hmax: | 0.00777 |
| (8) (\|x(H)\| − \|x0(H)\|)/(Co(N' − N)*fP) | |
| r13 | |
| 0.70Hmax: | −0.09351 |
| [Example 2] | |

TABLE 5-continued

[Example 1]

| | |
|---|---|
| (1) LBw/fw: | 0.82 |
| (2) \|fN/fw\|: | 0.91 |
| (3) β × T/β × W: | 1.25 |
| (4) \|fP/fw\|: | 5.8 |
| (5) βNT/βNW: | 5.9 |
| (6) img*R: | 8.8 |
| (7) (\|x(H)\| − \|x0(H)\|)/(Co(N' − N)*fN) | |
| r10 | |
| 0.70Hmax: | 0.00796 |
| r11 | |
| 0.70Hmax: | −0.06176 |
| r19 | |
| 0.70Hmax: | −0.03427 |
| r20 | |
| 0.70Hmax: | 0.00933 |
| (8) (\|x(H)\| − \|x0(H)\|)/(Co(N' − N)*fP) | |
| r13 | |
| 0.70Hmax: | −0.05543 |

[Example 3]

| | |
|---|---|
| (1) LBw/fw: | 0.80 |
| (2) \|fN/fw\|: | 0.86 |
| (3) β × T/β × W: | 1.40 |
| (4) \|fP/fw\|: | 5.3 |
| (5) βNT/βNW: | 4.8 |
| (6) img*R: | 8.4 |
| (7) (\|x(H)\| − \|x0(H)\|)/(Co(N' − N)*fN) | |
| r10 | |
| 0.70Hmax: | 0.01150 |
| r11 | |
| 0.70Hmax: | −0.04345 |
| r19 | |
| 0.70Hmax: | −0.04292 |
| r20 | |
| 0.70Hmax: | 0.00927 |
| (8) (\|x(H)\| − \|x0(H)\|)/(Co(N' − N)*fP) | |
| r13 | |
| 0.70Hmax: | −0.05213 |

[Example 4]

| | |
|---|---|
| (1) LBw/fw: | 0.69 |
| (2) \|fN/fw\|: | 1.15 |
| (3) β × T/β × W: | 1.04 |
| (4) \|fP/fw\|: | 8.2 |
| (5) βNT/βNW | 4.5 |
| (6) img*R: | 8.9 |
| (7) (\|x(H)\| − \|x0(H)\|)/(Co(N' − N)*fN) | |
| r6 | |
| 0.70Hmax: | −1.18842 |
| r7 | |
| 0.70Hmax: | 0.13649 |
| (8) (\|x(H)\| − \|x0(H)\|)/(Co(N' − N)*fP) | |
| r14 | |
| 0.70Hmax: | −0.05482 |
| r15 | |
| 0.70Hmax: | −0.00306 |
| r18 | |
| 0.70Hmax: | 0.04111 |
| r19 | |
| 0.70Hmax: | 0.06089 |

As described above in detail, according to the invention, it is possible to provide a zoom lens system which is compact and which can satisfy the requirements of high variable magnification and high image quality.

Therefore, when the zoom lens system of the invention is applied to an imaging optical system of a digital camera, the zoom lens system can contribute to a high performance and compactness of the camera.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

That which is claimed is:

1. A zoom lens system comprising:

a plurality of lens units arranged along an optical axis between and including an image side lens unit, which is closest to an image side of the zoom lens system, and an object side lens unit, which is closest to an object side of the zoom lens system, said plurality of lens units including at least one lens unit having a positive optical power and at least one lens unit having a negative optical power;

wherein said image side lens unit has a negative optical power, wherein at least two lens units of said plurality of lens units, including said image side lens unit, are movable in a zooming operation from a shortest focal length condition to a longest focal length condition; and wherein the zoom lens system satisfies the following conditions:

$$0.6 < LBw / fw < 1.7$$

$$0.6 < |fN / fw| < 1.7$$

$$7.5 < img * R < 9.8$$

where

LBw represents a back focus length at said shortest focal length condition;

fw represents a focal length of the zoom lens system at said shortest focal length condition;

fN represents a focal length of a lens unit, having a negative optical power, which is closest to said object side;

img represents a diameter of an image circle; and

R represents an effective diameter of an optical path of a lens face closest to said image side of the zoom lens system.

2. A zoom lens system as claimed in claim 1, wherein said image side lens unit and a lens unit which is adjacent to said image side lens unit are monotonically moved toward the object side in the zooming operation from the shortest focal length to the longest focal length condition.

3. A zoom lens system comprising:

a plurality of lens units arranged along an optical axis between and including an image side lens unit, which is closest to an image side of the zoom lens system, and an object side lens unit, which is closest to an object side of the zoom lens system, said plurality of lens units including at least one lens unit having a positive optical power and at least one lens unit having a negative optical power;

wherein said image side lens unit has a negative optical power, wherein at least two lens units of said plurality of lens units, including said image side lens unit, are movable in a zooming operation from a shortest focal length condition to a longest focal length condition;

wherein a lens unit which is adjacent to said image side lens unit is fixed in the zooming operation; and wherein the zoom lens system satisfies the following conditions:

$$0.6 < LBw/fw < 1.7$$
$$0.6 < |fN/fw| < 1.7$$

where

LBw represents a back focus length at said shortest focal length condition;

fw represents a focal length of the zoom lens system at said shortest focal length condition; and fN represents a focal length of a lens unit, having a negative optical power, which is closest to said object side.

4. A zoom lens system as claimed in claim 1, wherein said image side lens unit is monotonically moved toward the object side in the zooming operation from the shortest focal length condition to the longest focal length condition.

5. A zoom lens system comprising:

a plurality of lens units arranged along an optical axis between and including an image side lens unit, which is closest to an image side of the zoom lens system, and an object side lens unit, which is closest to an object side of the zoom lens system, said plurality of lens units including at least one lens unit having a positive optical power and at least one lens unit having a negative optical power;

wherein said image side lens unit has a negative optical power, wherein at least two lens units of said plurality of lens units, including said image side lens unit, are movable in a zooming operation from a shortest focal length condition to a longest focal length condition;

wherein said image side lens unit is nonlinearly moved in the zooming operation from the shortest focal length condition to the longest focal length condition; and wherein the zoom lens system satisfies the following conditions:

$$0.6 < LBw/fw < 1.7$$
$$0.6 < |fN/fw| < 1.7$$

where

LBw represents a back focus length at said shortest focal length condition;

fw represents a focal length of the zoom lens system at said shortest focal length condition; and fN represents a focal length of a lens unit, having a negative optical power, which is closest to said object side.

6. A zoom lens system as claimed in claim 1, wherein the zoom lens system comprises, from the object side of said zoom lens system to the image side of said zoom lens system, a first lens unit having a positive optical power, a second lens unit having a negative optical power, a third lens unit having a positive optical power and a fourth lens unit having a negative optical power, said fourth lens unit being said image side lens unit.

7. A zoom lens system as claimed in claim 1, wherein the zoom lens system comprises, from the object side of said zoom lens system to the image side of said zoom lens system, a first lens unit having a positive optical power, a second lens unit having a negative optical power, a third lens unit having a positive optical power, a fourth lens unit having a positive optical power and a fifth lens unit having a negative optical power, said fifth lens unit being said image side lens unit.

8. A zoom lens system as claimed in claim 1, wherein a filter is provided between said image side lens unit and an image plane.

9. A zoom lens system comprising:

a plurality of lens units arranged along an optical axis between and including an image side lens unit, which is closest to an image side of the zoom lens system, and an object side lens unit, which is closest to an object side of the zoom lens system, said plurality of lens units including at least one lens unit having a positive optical power and at least one lens unit having a negative optical power;

wherein said image side lens unit has a negative optical power, wherein at least two lens units of said plurality of lens units, including said image side lens unit, are movable in a zooming operation from a shortest focal length condition to a longest focal length condition; and wherein the zoom lens system satisfies the following conditions:

$$0.6 < LBw/fw < 1.7$$
$$0.6 < |fN/fw| < 1.7$$
$$1 < \beta \times T/\beta \times W < 1.5$$

where

LBw represents a back focus length at said shortest focal length condition;

fw represents a focal length of the zoom lens system at said shortest focal length condition;

fN represents a focal length of a lens unit, having a negative optical power, which is closest to said object side;

βxT represents a lateral magnification of said image side lens unit at the longest focal length condition; and βxW represents a lateral magnification of said image side lens unit at the shortest focal length condition.

10. A zoom lens system comprising:

a plurality of lens units arranged along an optical axis between and including an image side lens unit, which is closest to an image side of the zoom lens system, and an object side lens unit, which is closest to an object side of the zoom lens system, said plurality of lens units including at least one lens unit having a positive optical power and at least one lens unit having a negative optical power;

wherein said image side lens unit has a negative optical power, wherein at least two lens units of said plurality of lens units, including said image side lens unit, are movable in a zooming operation from a shortest focal length condition to a longest focal length condition; and wherein the zoom lens system satisfies the following conditions:

$$0.6 < LBw/fw < 1.7$$
$$0.6 < |fN/fw| < 1.7$$

-continued $$4.0 < |fP/fw| < 9.5$$

where
LBw represents a back focus length at said shortest focal length condition;
fw represents a focal length of the zoom lens system at said shortest focal length condition;
fN represents a focal length of a lens unit, having a negative optical power, which is closest to said object side; and
fP represents a focal length of a positive lens unit which is closest to said object side among said at least one lens unit having a positive optical power.

11. A zoom lens system comprising:
a plurality of lens units arranged along an optical axis between and including an image side lens unit, which is closest to an image side of the zoom lens system, and an object side lens unit, which is closest to an object side of the zoom lens system, said plurality of lens units including at least one lens unit having a positive optical power and at least one lens unit having a negative optical power;
wherein said image side lens unit has a negative optical power,
wherein at least two lens units of said plurality of lens units, including said image side lens unit, are movable in a zooming operation from a shortest focal length condition to a longest focal length condition; and
wherein the zoom lens system satisfies the following conditions:

$$0.6 < LBw/fw < 1.7$$
$$0.6 < |fN/fw| < 1.7$$
$$3.5 < \beta NT/\beta NW < 9.5$$

where
LBw represents a back focus length at said shortest focal length condition;
fw represents a focal length of the zoom lens system at said shortest focal length condition;
fN represents a focal length of a lens unit, having a negative optical power, which is closest to said object side;
βNT represents a lateral magnification of a negative lens unit which is closest to said object side among said at least one lens unit having a negative optical power, at the longest focal length condition; and
βNW represents a lateral magnification of the negative lens unit which is closest to said object side among said at least one lens unit having a negative optical power, at the shortest focal length condition.

12. A zoom lens system comprising:
a plurality of lens units arranged along an optical axis between and including an image side lens unit, which is closest to an image side of the zoom lens system, and an object side lens unit, which is closest to an object side of the zoom lens system, said plurality of lens units including at least one lens unit having a positive optical power and at least one lens unit having a negative optical power;
wherein said image side lens unit has a negative optical power,
wherein at least two lens units of said plurality of lens units, including said image side lens unit, are movable in a zooming operation from a shortest focal length condition to a longest focal length condition;
wherein the zoom lens system has a diaphragm which is moved in the zooming operation; and
wherein the zoom lens system satisfies the following conditions:

$$0.6 < LBw/fw < 1.7$$
$$0.6 < |fN/fw| < 1.7$$

where
LBw represents a back focus length at said shortest focal length condition;
fw represents a focal length of the zoom lens system at said shortest focal length condition; and
fN represents a focal length of a lens unit, having a negative optical power, which is closest to said object side.

13. A zoom lens system comprising:
a plurality of lens units arranged along an optical axis between and including an image side lens unit, which is closest to an image side of the zoom lens system, and an object side lens unit, which is closest to an object side of the zoom lens system, said plurality of lens units including at least one lens unit having a positive optical power and at least one lens unit having a negative optical power;
wherein said image side lens unit has a negative optical power,
wherein at least two lens units of said plurality of lens units, including said image side lens unit, are movable in a zooming operation from a shortest focal length condition to a longest focal length condition;
wherein the zoom lens system has a diaphragm which is fixed in the zooming operation; and
wherein the zoom lens system satisfies the following conditions:

$$0.6 < LBw/fw < 1.7$$
$$0.6 < |fN/fw| < 1.7$$

where
LBw represents a back focus length at said shortest focal length condition;
fw represents a focal length of the zoom lens system at said shortest focal length condition; and
fN represents a focal length of a lens unit, having a negative optical power, which is closest to said object side.

14. A zoom lens system comprising:
a plurality of lens units arranged along an optical axis between and including an image side lens unit, which is closest to an image side of the zoom lens system, and an object side lens unit, which is closest to an object side of the zoom lens system, said plurality of lens units including at least one lens unit having a positive optical power and at least one lens unit having a negative optical power;
wherein said image side lens unit has a negative optical power, wherein at least two lens units of said plurality of lens units, including said image side lens unit, are movable in a zooming operation from a shortest focal length condition to a longest focal length condition;

wherein the zoom lens system satisfies the following conditions:

$$0.6 < LBw/fw < 1.7$$
$$0.6 < |fN/fw| < 1.7$$

where

LBw represents a back focus length at said shortest focal length condition;

fw represents a focal length of the zoom lens system at said shortest focal length condition;

fN represents a focal length of a lens unit, having a negative optical power, which is closest to said object side; and wherein a negative lens unit which is closest to said image side among said at least one lens unit having a negative optical power has an aspherical surface, the aspherical surface satisfying the following condition, at a height of a maximum effective diameter of an optical path *0.7:

$$-2.5 < (|x(H)| - |x0(H)|)/(Co(N'-N)*fN_{imag}) < 0$$

where

Co represents a reference curvature of the aspherical surface;

N represents a refractive index of a medium, which is on an object side with respect to the aspherical surface, to a d-line;

N' represents a refractive index of a medium, which is on an image side with respect to the aspherical surface, to the d-line;

H represents a height in a direction perpendicular to the optical axis;

x(H) represents a displacement amount at the height H of the aspherical surface along the optical axis;

x0(H) represents a displacement amount at the height H of a reference spherical surface along the optical axis; and $fN_{imag}$ represents a focal length of the negative lens unit which is closest to the image side among said at least one lens unit having a negative optical power.

15. A zoom lens system comprising:

a plurality of lens units arranged along an optical axis between and including an image side lens unit, which is closest to an image side of the zoom lens system, and an object side lens unit, which is closest to an object side of the zoom lens system, said plurality of lens units including at least one lens unit having a positive optical power and at least one lens unit having a negative optical power;

wherein said image side lens unit has a negative optical power, wherein at least two lens units of said plurality of lens units, including said image side lens unit, are movable in a zooming operation from a shortest focal length condition to a longest focal length condition;

wherein the zoom lens system satisfies the following conditions:

$$0.6 < LBw/fw < 1.7$$
$$0.6 < |fN/fw| < 1.7$$

where

LBw represents a back focus length at said shortest focal length condition;

fw represents a focal length of the zoom lens system at said shortest focal length condition;

fN represents a focal length of a lens unit, having a negative optical power, which is closest to said object side; and wherein a positive lens unit has an aspherical surface, the aspherical surface satisfying the following condition, at a height of the maximum effective diameter of an optical path *0.7:

$$-0.5 < (|x(H)| - |x0(H)|)/(Co(N'-N)*fP) < 0$$

where

Co represents a reference curvature of the aspherical surface;

N represents a refractive index of a medium which is on an object side with respect to the aspherical surface, to a d-line;

N' represents a refractive index of a medium which is on an image side with respect to the aspherical surface, to the d-line;

H represents a height in a direction perpendicular to the optical axis;

x(H) represents a displacement amount at the height H of the aspherical surface along the optical axis;

x0(H) represents a displacement amount at the height H of a reference spherical surface along the optical axis; and fP represents a focal length of said positive lens unit.

16. A zoom lens system comprising:

a plurality of lens units arranged along an optical axis between and including an image side lens unit, which is closest to an image side of the zoom lens system, and an object side lens unit, which is closest to an object side of the zoom lens system, said plurality of lens units including at least one lens unit having a positive optical power and at least one lens unit having a negative optical power;

wherein said image side lens unit has a negative optical power, wherein at least two lens units of said plurality of lens units, including said image side lens unit, are movable in a zooming operation from a shortest focal length condition to a longest focal length condition;

wherein the zoom lens system satisfies the following conditions:

$$0.6 < LBw/fw < 1.7$$
$$0.6 < |fN/fw| < 1.7$$
$$1 < \beta \times T/\beta \times W < 1.5$$
$$4.0 < |fP/fw| < 9.5$$
$$3.5 < \beta NT/\beta NW < 9.5$$

-continued $$7.5 < img * R < 9.8$$

where
- LBw represents a back focus length at said shortest focal length condition;
- fw represents a focal length of the zoom lens system at said shortest focal length condition;
- fN represents a focal length of a lens unit, having a negative optical power, which is closest to said object side;
- βxT represents a lateral magnification of said image side lens unit at the longest focal length condition;
- βxW represents a lateral magnification of said image side lens unit at the shortest focal length condition;
- fP represents a focal length of a positive lens unit which is closest to said object side among said at least one lens unit having a positive optical power;
- βNT represents a lateral magnification of a negative lens unit which is closest to said object side among said at least one lens unit having a negative optical power, at the longest focal length condition;
- βNW represents a lateral magnification of a negative lens unit which is closest to said object side among said at least one lens unit having a negative optical power, at the shortest focal length condition;
- img represents a diameter of an image circle; and
- R represents an effective diameter of an optical path of a lens face closest to said image side of the zoom lens system.

17. A zoom lens system as claimed in claim 16, wherein a negative lens unit which is closest to said image side among said at least one lens unit having a negative optical power has an aspherical surface, the aspherical surface satisfying the following condition, at a height of a maximum effective diameter of the optical path *0.7:

$$-2.5 < (|x(H)| - |x0(H)|)(Co(N'-N)*fN_{imag}) < 0$$

where
- Co represents a reference curvature of the aspherical surface;
- N represents a refractive index of a medium, which is on an object side with respect to the aspherical surface, to a d-line;
- N' represents a refractive index of a medium, which is on an image side with respect to the aspherical surface, to the d-line;
- H represents a height in a direction perpendicular to the optical axis;
- x(H) represents a displacement amount at the height H of the aspherical surface along the optical axis;
- x0(H) represents a displacement amount at the height H of a reference spherical surface along the optical axis; and
- $fN_{imag}$ represents a focal length of the negative lens unit which is closest to the image side among said at least one lens unit having a negative optical power.

18. A zoom lens system as claimed in claim 16, wherein a positive lens unit has an aspherical surface, the aspherical surface satisfying the following condition, at a height of a maximum effective diameter of the optical path *0.7:

$$-0.5 < (|x(H)| - |x0(H)|)/(Co(N'-N)*fP) < 0$$

where
- Co represents a reference curvature of the aspherical surface;
- N represents a refractive index of a medium which is on an object side with respect to the aspherical surface, to a d-line;
- N' represents a refractive index of a medium which is on an image side with respect to the aspherical surface, to the d-line;
- H represents a height in a direction perpendicular to the optical axis;
- x(H) represents a displacement amount at the height H of the aspherical surface along the optical axis;
- x0(H) represents a displacement amount at the height H of a reference spherical surface along the optical axis; and
- fP represents a focal length of said positive lens unit.

19. An apparatus comprising:
a solid state imaging device;
a zoom lens system for forming an image of an object on said solid state imaging device, said zoom lens system including a plurality of lens units;
said plurality of lens units being arranged along an optical axis between and including an image side lens unit which is closest to an image side of the zoom lens system, and an object side lens unit, which is closest to an object side of the zoom lens system, said plurality of lens units including at least one lens unit having a positive optical power and at least one lens unit having a negative optical power; and
filters provided between said image side lens and said solid state imaging device, said filters including an optical low-pass filter;
wherein said image side lens unit has a negative optical power;
wherein at least two lens units of said plurality of lens units, including said image side lens unit, are movable in a zooming operation from a shortest focal length condition to a longest focal length condition; and
wherein said zoom lens system satisfies the following conditions:

$$0.6 < LBw / fw < 1.7$$
$$0.6 < |fN / fw| < 1.7$$
$$7.5 < img * R < 9.8$$

where
- LBw represents a back focus length at the shortest focal length condition;
- fw represents a focal length of said zoom lens system at the shortest focal length condition;
- fN represents a focal length of a lens unit, having negative optical power, which is closest to the object side;
- img represents a diameter of an image circle; and
- R represents an effective diameter of an optical path of a lens face closest to said image side of the zoom lens system.

20. A zoom lens system comprising:
a plurality of lens units arranged along an optical axis between and including an image side lens unit, which is closest to an image side of the zoom lens system, and an object side lens unit, which is closest to an object side of the zoom lens system, said plurality of lens units including at least one lens unit having a positive optical power and at least one lens unit having a negative optical power;

wherein said image side lens unit has a negative optical power, wherein at least two lens units of said plurality of lens units, including said image side lens unit, are movable in a zooming operation from a shortest focal length condition to a longest focal length condition; and wherein the zoom lens system satisfies the following conditions:

$$0.6 < LBw/fw < 1.7$$
$$0.65 < |fN/fw| < 1.7$$

where

LBw represents a back focus length at said shortest focal length condition;

fw represents a focal length of the zoom lens system at said shortest focal length condition; and fN represents a focal length of a lens unit, having a negative optical power, which is closest to said object side.

21. A zoom lens system as claimed in claim 20, wherein the zoom lens system satisfies the following condition:

$$0.69 \leq |fN/fw|.$$

* * * * *

UNITED STATES PATENT AND TRADEMARK OFFICE
CERTIFICATE OF CORRECTION

PATENT NO.    : 6,118,592
DATED         : September 12, 2000
INVENTOR(S)   : Tetsuo Kohno et al.

It is certified that error appears in the above-identified patent and that said Letters Patent is hereby corrected as shown below:

Title page,
Item [75] Inventors:, the first line, delete "Toyonaka", and insert -- Toyonaka-Shi --.
The second line, after "Konno,", delete "Sakai", and insert -- Sakai-Shi --.
The second line, after "Terada,", delete "Sakai", and insert -- Sakai-Shi --.
The third line, after "Arimoto,", delete "Sakai", and insert -- Sakai-Shi --.
The fourth line, after "Okada,", delete "Nishinomiya", and insert
-- Nishinomiya-Shi" --.
The fifth line, after "Ishimaru,", delete "Kishiwada", and insert -- Kishiwada-Shi --.

Column 18,
Line 15, after "power", delete ",", and insert -- ; --.
Line 58, after "power", delete ",", and insert -- ; --.

Column 19,
Line 30, after "power", delete ",", and insert -- ; --.

Column 20,
Line 18, after "power", delete ",", and insert -- ; --.
Line 55, after "power", delete ",", and insert -- ; --.

Column 21,
Line 26, after "power", delete ",", and insert -- ; --.
Line 67, after "power", delete ",", and insert -- ; --.

Column 22,
Line 34, after "power", delete ",", and insert -- ; --.
Line 67, after "power", delete ",", and insert -- ; --.

Column 23,
Line 60, after "power", delete ",", and insert -- ; --.

Column 24,
Line 18, delete "the", and insert -- a --.
Line 51, after "power", delete ",", and insert -- ; --.
Line 66, delete "$3.5<\beta NT/\beta NW<9.5$", and insert -- $3.5<\beta NT/\beta NW<7.5$ --.

UNITED STATES PATENT AND TRADEMARK OFFICE
CERTIFICATE OF CORRECTION

PATENT NO. : 6,118,592
DATED : September 12, 2000
INVENTOR(S) : Tetsuo Kohno et al.

It is certified that error appears in the above-identified patent and that said Letters Patent is hereby corrected as shown below:

Column 27,
Line 4, after "power", delete ",", and insert -- ; --.

Signed and Sealed this

Ninth Day of October, 2001

*Attest:*

*Attesting Officer*

NICHOLAS P. GODICI
*Acting Director of the United States Patent and Trademark Office*